United States Patent
Boding et al.

(10) Patent No.: US 11,107,059 B2
(45) Date of Patent: *Aug. 31, 2021

(54) METHOD AND SYSTEM FOR DATA SECURITY UTILIZING USER BEHAVIOR AND DEVICE IDENTIFICATION

(71) Applicant: Visa International Service Association, San Francisco, CA (US)

(72) Inventors: B. Scott Boding, Mountain View, CA (US); Andrew Naumann zu Koenigsbrueck, Princeton, NJ (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/559,439

(22) Filed: Sep. 3, 2019

(65) Prior Publication Data

US 2019/0392421 A1 Dec. 26, 2019

Related U.S. Application Data

(63) Continuation of application No. 13/925,656, filed on Jun. 24, 2013, now Pat. No. 10,445,721.

(Continued)

(51) Int. Cl.
*G06Q 20/32* (2012.01)
*G06Q 20/34* (2012.01)
(Continued)

(52) U.S. Cl.
CPC ....... *G06Q 20/3227* (2013.01); *G06Q 20/352* (2013.01); *G06Q 20/4016* (2013.01); *G06Q 30/0609* (2013.01)

(58) Field of Classification Search
CPC ............ G06Q 20/3227; G06Q 20/352; G06Q 20/4016; G06Q 30/0609
(Continued)

(56) References Cited

U.S. PATENT DOCUMENTS 8,244,629 B2 8/2012 Lewis
2004/0215579 A1 10/2004 Redenbaugh
(Continued)

FOREIGN PATENT DOCUMENTS

WO 2014004399 1/2014

OTHER PUBLICATIONS

Silver Tail Systems, "Attack Intelligence Detects and Remediates Attacks Against the Navigation Layer in Hours, Not Weeks", E-Commerce Navigation Layer Protection Data Sheet, Silver Tail Systems—4 Pages. Oct. 2011 (Year: 2011).*
(Continued)

*Primary Examiner* — Benjamin S Brindley
(74) *Attorney, Agent, or Firm* — Kilpatrick Townsend & Stockton LLP

(57) ABSTRACT

Embodiments of the invention broadly described, introduce systems and methods for detecting the likelihood that a transaction is fraudulent using user access pattern data and device fingerprint data. One embodiment of the invention discloses a method for determining the likelihood that a payment transaction is fraudulent. The method comprises receiving user access pattern data generated by a user client computer, receiving a device fingerprint associated with the user client computer conducting a payment transaction, determining, using the user access pattern data and the device fingerprint, a likelihood that the payment transaction is fraudulent.

20 Claims, 10 Drawing Sheets

Related U.S. Application Data

(60) Provisional application No. 61/664,076, filed on Jun. 25, 2012.

(51) Int. Cl.
  *G06Q 20/40* (2012.01)
  *G06Q 30/06* (2012.01)

(58) Field of Classification Search
  USPC .......................................................... 705/44
  See application file for complete search history.

(56) References Cited

U.S. PATENT DOCUMENTS

| | | | | |
|---|---|---|---|---|
| 2006/0282660 | A1* | 12/2006 | Varghese | G06Q 20/4016 713/155 |
| 2008/0227471 | A1* | 9/2008 | Dankar | G06Q 20/3224 455/456.6 |
| 2009/0089869 | A1* | 4/2009 | Varghese | G06Q 20/4014 726/7 |
| 2010/0094791 | A1* | 4/2010 | Miltonberger | G06Q 20/4016 706/46 |
| 2010/0185421 | A1* | 7/2010 | Daly | G09B 19/025 703/2 |
| 2010/0235908 | A1* | 9/2010 | Eynon | G06F 21/552 726/22 |
| 2010/0235909 | A1* | 9/2010 | Eynon | H04L 63/168 726/22 |
| 2011/0016052 | A1* | 1/2011 | Scragg | G06Q 20/405 705/44 |
| 2011/0131122 | A1 | 6/2011 | Griffin et al. | |
| 2011/0185421 | A1 | 7/2011 | Wittenstein et al. | |
| 2011/0191250 | A1* | 8/2011 | Bishop | G06Q 20/3821 705/67 |
| 2011/0196781 | A1 | 8/2011 | Stipek et al. | |
| 2011/0196791 | A1* | 8/2011 | Dominguez | G06Q 20/40 705/44 |
| 2011/0214187 | A1 | 9/2011 | Wittenstein | |
| 2011/0302653 | A1 | 12/2011 | Frantz | |
| 2012/0016633 | A1 | 1/2012 | Wittenstein | |
| 2012/0158541 | A1 | 6/2012 | Ganti | |
| 2012/0215648 | A1* | 8/2012 | Rose | G06Q 20/3224 705/16 |
| 2012/0278246 | A1* | 11/2012 | Boding | G06Q 10/10 705/317 |
| 2013/0067547 | A1* | 3/2013 | Thavasi | G06F 21/31 726/7 |
| 2013/0346311 | A1 | 12/2013 | Boding et al. | |

OTHER PUBLICATIONS

"Attack Intelligence Detects and Remediates Attacks Against the Navigation Layer in Hours, Not Weeks", Silver Tail Systems, E-Commerce Navigation Layer Protection Data Sheet, Silver Tail Systems, www.silvertailsystems.com, Oct. 2011, 4 pages.

"International Search Report and Written Opinion dated Oct. 7, 2013 in PCT/US2013/047398, 15 pages Preliminary Report on Patentability", Jan. 8, 2015, 11 pages.

U.S. Appl. No. 13/925,656 , "Advisory Action", dated Aug. 21, 2015, 3 pages.

U.S. Appl. No. 13/925,656 , "Final Office Action", dated May 12, 2015, 24 pages.

U.S. Appl. No. 13/925,656 , "Final Office Action", dated Jun. 9, 2016, 29 pages.

U.S. Appl. No. 13/925,656 , "Non-Final Office Action", dated Oct. 3, 2014, 20 pages.

U.S. Appl. No. 13/925,656 , "Non-Final Office Action", dated Dec. 21, 2015, 28 pages.

U.S. Appl. No. 13/925,656 , "Notice of Allowability", dated Aug. 22, 2019, 4 pages.

U.S. Appl. No. 13/925,656 , "Notice of Allowance", dated May 10, 2019, 11 pages.

\* cited by examiner

METHOD AND SYSTEM FOR DATA SECURITY UTILIZING USER BEHAVIOR AND DEVICE IDENTIFICATION

CROSS-REFERENCES TO RELATED APPLICATIONS

The present application is a continuation of non-provisional application Ser. No. 13/925,656, filed on Jun. 24, 2013, which claims priority to U.S. Provisional Application No. 61/664,076, filed on Jun. 25, 2012, the entire contents of each of which are herein incorporated by reference in their entirety for all purposes.

BACKGROUND

Fraud rules are rules that may be used to automatically detect fraudulent activity. For example, fraud rules may be used to determine if a payment transaction is fraudulent, or if a payment account has been compromised. Fraud rules may be evaluated at a payment account issuer, payment processing network, or merchant acquirer. If a fraudulent transaction is detected, it may be rejected, flagged for manual review, or approved.

Fraud rules are widely utilized, but existing techniques may have difficulty determining certain types of fraudulent activity. For example, fraudsters may use web robots (i.e., bots) or other programmatic techniques to rapidly crawl a merchant web site for security vulnerabilities. In addition, bots may be used to perform fraudulent activity at a large scale, such as by conducting payment transactions using tens or hundreds of stolen accounts in quick succession. Such fraudulent activity may be problematic for merchants.

Embodiments of the invention address these and other problems.

SUMMARY

Embodiments of the invention broadly described, introduce systems and methods for detecting the likelihood that a transaction is fraudulent using user access pattern data and device fingerprint data.

One embodiment of the invention discloses a computer-implemented method for selecting a field combination. The method comprises receiving, by a processor, user access pattern data generated by a user client computer, receiving, by the processor, a device fingerprint associated with the user client computer conducting a payment transaction, and determining, using the user access pattern data and the device fingerprint, a likelihood that the payment transaction is fraudulent.

One embodiment of the invention discloses a server computer. The server computer comprises a processor and a non-transitory computer-readable storage medium, comprising code executable by the processor for implementing a method comprising receiving, by a processor, user access pattern data generated by a user client computer, receiving, by the processor, a device fingerprint associated with the user client computer conducting a payment transaction, and determining, using the user access pattern data and the device fingerprint, a likelihood that the payment transaction is fraudulent.

One embodiment of the invention discloses a computer-implemented method for conducting a payment transaction. The method comprises conducting, using a user client computer, a payment transaction, sending user access pattern data associated with the user client computer, sending a device fingerprint associated with the user client computer conducting the payment transaction, and receiving an indication of the likelihood that the payment transaction is fraudulent, wherein the indication of the likelihood that the payment transaction is fraudulent comprises an authorization or denial of the payment transaction.

One embodiment of the invention discloses a computer-implemented method for conducting a payment transaction. The method comprises receiving, at a merchant computer, a payment transaction conducted using the user client computer, sending user access pattern data associated with the user client computer, sending a device fingerprint associated with the user client computer conducting the payment transaction, and receiving an indication of the likelihood that the payment transaction is fraudulent, wherein the indication of the likelihood that the payment transaction is fraudulent is received in an authorization response message.

One embodiment of the invention discloses a computer-implemented method for conducting a payment transaction. The method comprises receiving, at a merchant processor computer, an authorization response message for the payment transaction, routing the authorization response message to a fraud detection system, sending user access pattern data associated with the user client computer, sending a device fingerprint associated with the user client computer conducting the payment transaction, receiving an indication of the likelihood that the payment transaction is fraudulent, and sending the authorization response message to a merchant computer, wherein the authorization response message indicates the likelihood that the payment transaction is fraudulent.

Further details regarding embodiments of the invention can be found in the Detailed Description and the Figures.

DETAILED DESCRIPTION

Figure 1:
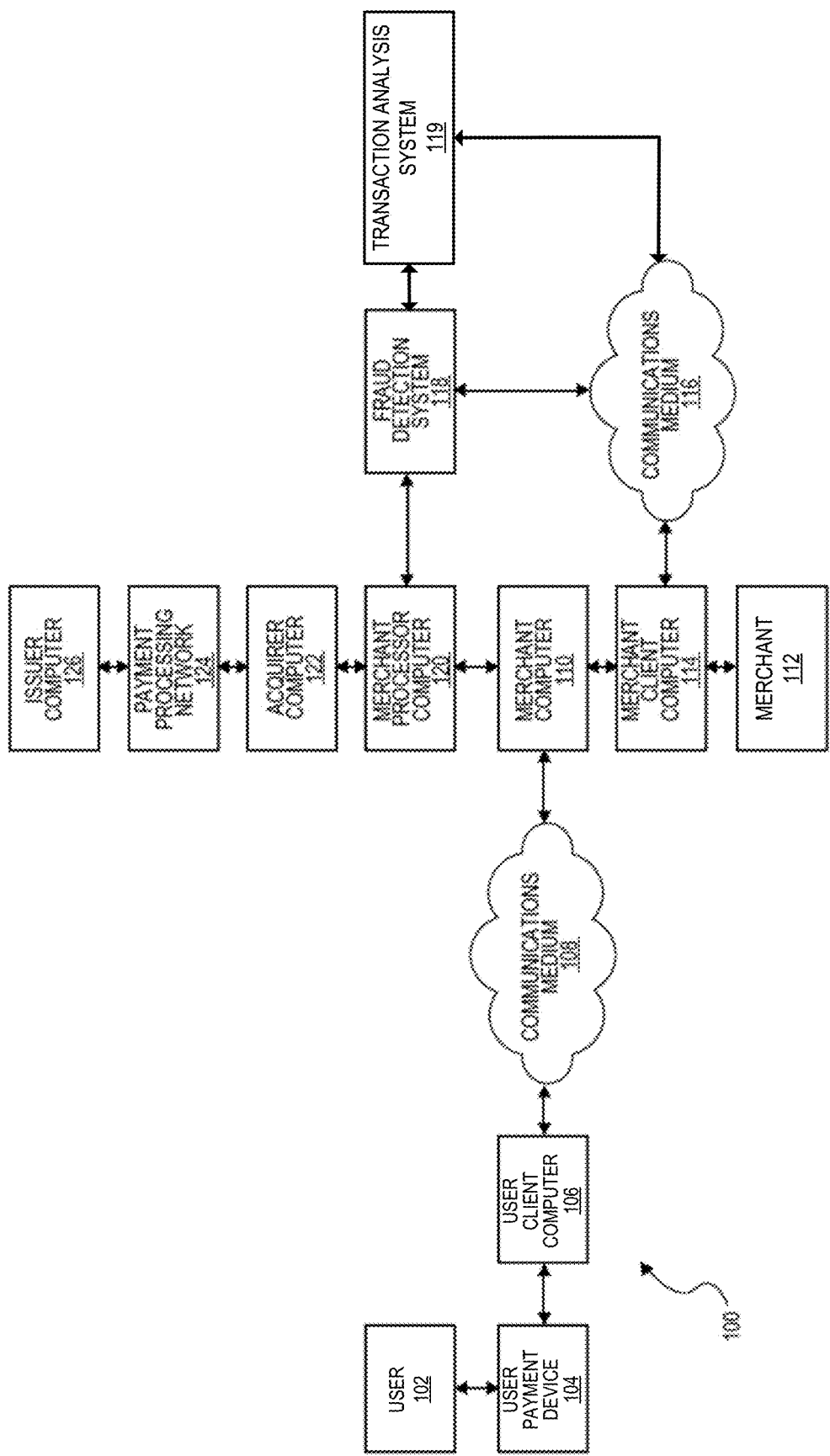
FIG. 1 shows a system according to an embodiment of the invention.

Prior to discussing embodiments of the invention, descriptions of some terms may be helpful in understanding embodiments of the invention.

An "access pattern" may refer to any activity performed by a computing device when accessing a second computing device. "Access pattern data" may include any data associated with an access pattern. For example, access pattern data may comprise user input interaction data generated by from mouse clicks and movement, key strokes, or other user input over a period of time. Access pattern data may also comprise data connection attributes (e.g., IP addresses, MAC addresses, ports, certificates, keys, session data, and timestamps), data transmitted (e.g., request messages), and data received (e.g., response messages). Access pattern data may further comprise semantic data associated with the activity. For example, for a user navigating a web-based retailer, access pattern data may comprise items viewed, items added to a shopping cart, items purchased, and reviews written. In various embodiments, access pattern data may be combined or derived from other access pattern data (e.g., a velocity or frequency of mouse clicks).

A "device fingerprint" may be any information used to identify a computing device or specific characteristics of the computing device. For example, "device fingerprint data" may comprise an IP address, MAC address, serial number, product number, hardware information, SIM card number, suitable combinations or derivations thereof, or other data that uniquely identifies a device. In some embodiments, a device fingerprint may uniquely identify a device. In other embodiments, the device fingerprint may not be unique to the device but still provide various characteristics of the device. For example, in some embodiments, the device fingerprint may be used to determine whether a device is a desktop computer, laptop computer, tablet, mobile phone, or other device. In addition, the device fingerprint may comprise information regarding peripherals and other hardware associated with the device, such as input devices, memory, storage, and network interfaces.

A "fraud rule" may include any procedure or definition used to determine a likelihood that a transaction is fraudulent, or as otherwise known in the art. In some embodiments, a fraud rule may specify a condition under which the transaction may be determined to be fraudulent. For example, a "user access pattern fraud rule" may be used to determine if user access pattern data for the transaction indicates fraud. For example, a user access pattern fraud rule may indicate that a transaction with a velocity of mouse clicks or web page requests above a certain threshold is determined to indicate fraud (e.g., because the transaction was likely conducted by a bot). Other types of data access patterns can include the average amount of time that a user spends on a particular Website, the pattern of cursor movement (which may indicate that the user is more inclined to use a mouse, touchpad, or trackball as an alternative data input device to a keyboard), and the regularity or irregularity of data input. Fraud rules may be generated based upon these characteristics to differentiate authentic user input as opposed to fraudulent computer input produced by a machine or imposter.

In addition, a "device fingerprint fraud rule" may be used to determine if device fingerprint data for the transaction indicates fraud. For example, a device fingerprint fraud rule may indicate that a transaction conducted using a device that is associated with over a certain threshold of accounts indicates fraud, so that if device used to conduct a transaction is associated with hundreds of user accounts, the transaction is determined to be fraudulent (e.g., because it is unlikely that an uncompromised device would be used to access hundreds of user accounts).

An "inconsistent access pattern and device fingerprint fraud rule" may be used to determine if an inconsistency between user access pattern data and device fingerprint data indicates fraud. In some embodiments, the inconsistency may relate to the combination of the type of device and the access pattern. For example, a user operating a mobile phone will typically have a lower text input speed than the user operating a desktop computer. Accordingly, an inconsistent access pattern and device fingerprint fraud rule may be defined so that a transaction conducted by a user operating a mobile phone with a text input speed significantly greater than a user's average on a desktop is determined to indicate fraud (e.g., because it is unlikely that a legitimate user would input text faster on a mobile phone than a desktop computer).

Fraud rules may be defined in any suitable terms. For example, fraud rules may be defined in absolute terms (e.g., a transaction with mouse click frequency of greater than 60 per minute is fraudulent). In addition, fraud rules may be defined relative to prior data for the user (e.g., a transaction with mouse click frequency double the average mouse click frequency for a user is fraudulent). Fraud rules may also be defined relative to prior data for a plurality of users (e.g., a transaction with mouse click frequency in the top 1 percentile is marked for review).

Fraud rules may indicate the likelihood that a transaction is fraudulent in any suitable manner. For example, some fraud rules may be binary, so that a transaction is either determined to be fraudulent or not fraudulent. Alternately, some fraud rules may be used to determine a quantitative indication (e.g., a fraud score between 0 and 100) of the likelihood of fraud.

Embodiments of the invention provide for many technical advantages. For example, embodiments of the invention provide an effective method for identifying user access pattern data that is inconsistent with a device fingerprint for a transaction.

In one example, a user may operate a plurality of devices to conduct transactions (e.g., a desktop computer, a laptop computer, a tablet, and a mobile phone). Although operating multiple tabs simultaneously may be common on a desktop computer, it may not be common on a tablet or mobile phone. Accordingly, a fraud rule may be defined such that a transaction conducted on a tablet or mobile phone should have lower levels of multitasking. Later, while operating the tablet, the user inadvertently installs a fraudulent application that performs a man-in-the-browser attack that conducts a fraudulent transaction simultaneously in a separate browser tab. The fraudulent transaction would have an access pattern corresponding to high levels of multitasking and a device fingerprint corresponding to a tablet computer. Based on the previously defined rule, the transaction is determined indicate fraud. Thus, fraudulent transactions may be prevented, even when a user access pattern may be acceptable for other devices operated by the user.

In another example, a fraud rule may be defined wherein a user's average text input speed while operating desktop computer should be higher than when operating a mobile phone. Later, the user's mobile phone may be compromised and conduct several high-speed fraudulent transactions. User access pattern data for the fraudulent transactions would have a higher text input speed than the user's average for a desktop computer, so based on the previously defined rule transaction may be determined to indicate fraud. Thus, fraudulent transactions corresponding to the compromise of computing device may be prevented by comparing user access pattern data to prior access pattern data from different devices.

The above examples highlight only a few of the advantages of detecting the likelihood that a transaction is fraudulent using user access pattern data and device fingerprint data.

I. Exemplary Systems

A system 100 for transaction processing can be seen in FIG. 1. The system 100 includes a user 102, a user payment device 104, a user client computer 106, a merchant computer 110, a merchant 112, a merchant client computer 114, a fraud detection system 118, a transaction analysis system 119, a merchant processor computer 120, an acquirer computer 122, a payment processing network 124, and an issuer computer 126. In a typical transaction, a user 102 may purchase goods or services at a merchant associated with the merchant computer 110 using a user payment device 104. The transactions details are then sent to the merchant processor computer 120 and to the acquirer computer 122. The acquirer computer 122 can communicate with an issuer computer 126 via a payment processing network 124 for additional transaction processing. For simplicity of illustration, a certain number of components are shown is shown in FIG. 1. It is understood, however, that embodiments of the invention may include more than one of each component. In addition, some embodiments of the invention may include fewer than all of the components shown in FIG. 1. Also, the components in FIG. 1 may communicate via any suitable communication medium (including the internet), using any suitable communication protocol.

The user client computer 106 may communicate with the merchant computer 110 via a communications medium 108, such as a network (e.g. the Internet). Similarly, the merchant client computer 114 may communicate with the fraud detection system 118 via a communications medium 116, such as a network (e.g. the Internet).

The user 102 may be an individual, or an organization such as a business, that is capable of purchasing goods or services. The merchant 112 may be a merchant, an employee of the merchant, or any other individual who has access to the merchant client computer 114.

The user payment device 104 may be in any suitable form. For example, suitable user payment devices can be handheld and compact so that they can fit into a user's wallet and/or pocket (e.g., pocket-sized). The user payment device 104 can include a processor, and memory, input devices, and output devices, operatively coupled to the processor. Specific examples of user payment devices include cellular or wireless phones, personal digital assistants (PDAs), pagers, portable computers, smart cards, and the like. The user payment devices can also be debit devices (e.g., a debit card), credit devices (e.g., a credit card), or stored value devices (e.g., a pre-paid or stored value card).

The user 102 can use the user client computer 106, which is communicatively coupled to the merchant computer 110 via the communications medium 108 in order to conduct a transaction with the merchant. The user client computer 106 may be in any suitable form. Example of user mobile devices include any device capable of accessing the Internet, such as a personal computer, cellular or wireless phones, personal digital assistants (PDAs), tablet PCs, and handheld specialized readers. The user client computer 106 transmits data through the communications medium 108 to the merchant computer 110. In some embodiments of the invention, the user payment device 106 and the user client computer 106 may be a single device.

In certain embodiments, transaction analysis system 119 may interact with fraud detection system 118 to receive user access pattern data and device fingerprint data for use in evaluating fraud rules and improving the fraud detection of system 118. In alternate embodiments, user access pattern data and device fingerprint data may be sent directly from a merchant computer 114 to a transaction analysis system 119. In addition, transaction analysis system 119 may further interact and be communicatively coupled with any number of data sources (not shown) other than merchant client computer 114 or fraud detection system 118. Examples of potential data sources include direct information from web servers, application programming interfaces (APIs), routers, and other systems that collect user access pattern data or device fingerprint data. In alternative embodiments, multiple transaction analysis systems may be used, or a plurality of transaction analysis systems may feed data to a central transaction analysis system 119 that may communicate data to fraud detection system 118. In still further embodiments, transaction analysis system 119 and fraud detection system 118 may be integrated as a single system.

Figure 2:
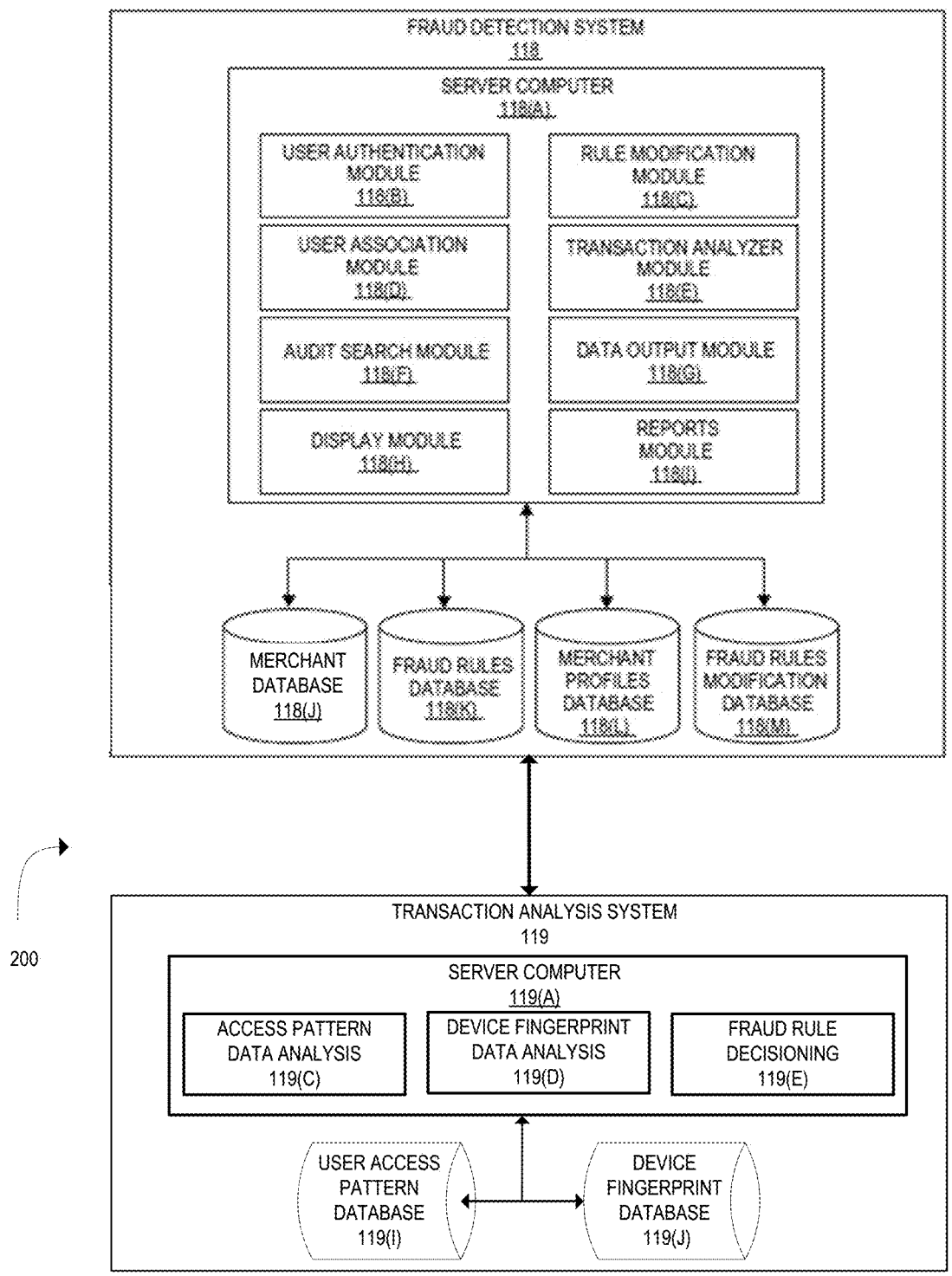
FIG. 2 shows a block diagram of components of a fraud detection system.

FIG. 2 shows one potential embodiment of a fraud detection system 118 in conjunction with one potential embodiment of a transaction analysis system 119. As depicted in FIG. 2, the fraud detection system 118 may comprise a server computer 118(A) comprising a user authentication module 118(B), a rule modification module 118(C), a user association module 118(D), a transaction analyzer module 118(E), an audit search module 118(F), a data output module 118(G), a display module 118(H), and a reports module 118(I). The various modules may be embodied by computer code, residing on computer readable media.

The server computer 118(A) may be operatively coupled to one or more databases. The one or more databases may comprise a merchant database 118(J), a fraud rules database 118(K), a merchant profiles database 118(L) and a fraud rules modification database 118(M).

The user authentication module 118(B) handles the verification of the authorization credentials for a user (e.g. merchant ID, user name, password). The user authentication module 118(B) may access a merchant database 118(J) in determining whether a merchant 112 seeking access to the fraud detection system 118 is an authorized user. For example, when presented with credentials, the user authentication module 118(B) may access the merchant database 118(J) to determine whether the provided user name is in the merchant database 118(J) and whether the provided password corresponds to the password linked to the user name.

The rule modification module 118(C) receives modifications from a merchant 112 to fraud detection rules or to a merchant profile. The rule modification module 118(C) may also receive modifications in the form of the creation of new merchant profiles or new fraud detection rules. For example, when a merchant 112 creates a new merchant profile, the rule modification module 118(C) may access the merchant profiles database 118(L) to store the new merchant profile. The rule modification module 118(C) may similarly access the fraud rules database 118(L) to store new fraud detection rules. The rule modification module 118(C) may further access the merchant profiles database 118(L) to store modifications made to a merchant profile. For example, when a merchant 112 makes a modification, the rule modification module 118(C) may access the merchant profile database 118(L) associated with the authorization credentials entered by the merchant 112. The rule modification module 118(C) may also access the fraud rules database 118(K) to access pre-established fraud detection rules to add to the merchant profile or to store newly created fraud detection rules created by the merchant 112 for the merchant profile. In some embodiments of the invention, new fraud detection rules created by the merchant 112 are stored in the merchant profiles database 118(L) with the corresponding merchant profile.

The user association module 118(D) may associate any modifications made by a merchant 112 with the authorization credentials entered by the merchant 112. For example, if the merchant 112 logged into the fraud detection system 118 with the user name "user1," the user association module 118(D) may record all the modifications made by the merchant 112, associate the modifications with the user name "user1," and store the data in the fraud rules modification database 118(M). The user association module 118(D) may also associate fraud detection rule sets with a user and/or merchant profile.

The transaction analyzer module 118(E) may evaluate transaction data received by the fraud detection system 118 from the merchant processor computer 120. In some embodiments of the invention, the fraud detection system 118 receives the authorization response message from the merchant processor computer 120 and the message is analyzed by the transaction analyzer module 118(E). Typically, transaction analyzer module 118(E) evaluates one or more fraud rules for the merchant stored in fraud rules database 118(K) and/or merchant profile database 118(L).

Transaction analyzer module 118(E) may communicate with other modules or systems in order to evaluate various types of fraud rules. For example, a fraud rule relating to access pattern data and/or device fingerprint data may be evaluated using transaction analysis system 119. In some embodiments, fraud detection system 118 may send the fraud rule, user access pattern data for a transaction, and device fingerprint data for the transaction to transaction analysis system 119. Transaction analysis system 119 may then analyze the access pattern data and device fingerprint data, evaluate a fraud rule, and send the result of the fraud rule to transaction analyzer module 118(E).

Once the fraud rules are evaluated, transaction analyzer module 118(E) assigns a fraud score to the transaction and/or assigns an outcome for the transaction. In some embodiments, if any fraud rule indicates that the transaction is fraudulent, the transaction may be rejected. In other embodiments, a combination or threshold number of fraud rule results may be used to determine an outcome for a transaction. If the outcome from the transaction analyzer module 118(E) is an "ACCEPT", the transaction between the merchant and the user 102 can be completed. If the outcome from the transaction analyzer module 118(E) is a "REJECT", the fraud detection system 118 would return a message to be presented to the user 102 that the user 102 may be contacted if there are any issues. For example, the user may receive a message stating, "Thank you for your order. We will contact you if there are any issues." In some embodiments of the invention, the message does not indicate that a "REJECT" was determined for the transaction as the user 102 may be attempting to conduct fraudulent transactions. If the outcome from the transaction analyzer module 118(E) is a "REVIEW", the fraud detection system 118 would "hold" the transaction until it can be further reviewed, and it is determined whether it should be accepted or rejected. In some embodiments, the fraud detection system 118 can automatically invoke a settlement upon an accept decision by the transaction analyzer module 118(E).

The audit search module 118(F) handles the audit log search function of the fraud detection system 118. The audit search module 118(F) receives input from a merchant 112 comprising search parameters to conduct an audit log search.

The audit search module 118(F) processes the search parameters and conducts a search of the fraud rules modification database 118(L).

The data output module 118(G) may output data to be displayed to the merchant 112. In some embodiments, the data output module may output a set of fraud detection rules or merchant profiles to the merchant 112. In other embodiments, the data outputted to the merchant 112 can include the results of an audit log search conducted by the audit search module 118(F).

The display module 118(H) displays the layout of the fraud detection system 118. In some embodiments of the invention, the fraud detection system 118 is accessed as a website over a communications medium (e.g. the Internet), via an Internet-enabled device capable of displaying HTML. Other embodiments allow the fraud detection system 118 to be displayed in other suitable manners on other suitable display devices.

The reports module 118(I) compiles the data obtained from the fraud detection system 118 from analyzing transactions. In some embodiments of the invention, the reports module 118(I) can provide detailed statistics and data for the merchant on the performance of the merchant's profile and selection of fraud detection rules. For example, the reports module 118(I) can prepare a report indicating the number of times each fraud detection rule was triggered by a transaction. It can further indicate the results of analyzed transactions (e.g. accepted, rejected, or sent for further review). In some embodiments of the invention, the reports module 118(I) can present the full transaction details for each transaction received by the fraud detection system 118.

The merchant database 118(J) may be used by the server computer 118(A) to store authentication elements for users. For example, the merchant database 118(J) may contain a plurality of merchant IDs and associated user names authorized to access the corresponding merchant profile stored in the merchant profiles database 118(L) in the fraud detection system 118. The merchant database 118(J) may further store passwords associated with each merchant ID and user name authorized to access the fraud detection system 118.

The fraud rules database 118(K) may be used by the server computer 118(A) to store fraud detection rules that can be added to merchant profiles. In some embodiments, a merchant profile can be loaded with pre-existing fraud detection rules contained in the fraud rules database 118(K). The fraud rules database 118(K) may further store new fraud detection rules created by a merchant 112. The fraud rules database 118(K) may also store a fraud detection rule set associated with the merchant 112 that can be accessed and presented to the merchant 112 when the merchant 112 requests a new merchant profile to be generated.

The merchant profiles database 118(L) may be used by the server computer 118(A) to store merchant profiles that are customized for each merchant that has created a profile with the fraud detection system 118. In some embodiments, the merchant profile database 118(L) may further store fraud detection rules that have been created for a merchant and associated with a merchant profile.

The fraud rules modification database 118(M) may be used by the server computer 118(A) to store an audit log containing details regarding merchant profiles, fraud detection rules, modifications made to the merchant profiles and fraud detection rules, the creation of new merchant profiles and fraud detection rules, and the user name of the merchant 112 who made the modifications to the fraud detection rules or merchant profiles. The data stored in the fraud rules modification database 118(M) may be stored by the rule modification module 118(C) and may be searched by the audit search module 118(F).

As further depicted in FIG. 2, the fraud detection system 118 may be connected to a transaction analysis system 119. In some embodiments of the invention, transaction analysis system 119 may be used by transaction analyzer module 118(E) to evaluate fraud rules relating to user access patterns or device fingerprints. Transaction analysis system 119 may comprise a server computer 119(A) comprising an access pattern data analysis module 119(C), a device fingerprint data analysis module 119(D), and a fraud rule decisioning module 119(E). The various modules may be embodied by computer code, residing on computer readable media, implemented in computer hardware, or as a mixture of any acceptable structure. The server computer 119(A) may be operatively coupled to one or more databases. The one or more databases may comprise a device fingerprint database 119(I), and a user access pattern database 119(J).

Access pattern data analysis module 119(C) may be configured to analyze user access pattern data to determine quantities or variables recited in a fraud rule. For example, user access pattern data may be received by transaction analysis system 119 in a raw format comprising a list of mouse clicks and positions by the user (e.g., in an list of order pairs of the form [time, position]). However, a fraud rule may depend on the average mouse click rate of the user during the entire transaction. Accordingly, access pattern data analysis module 119(C) may determine the total number of mouse clicks performed and divide the number by the time difference between the first mouse click and the last mouse click to calculate the average mouse click rate of the user. Similarly, access pattern data analysis module 119(C) may calculate any quantity or variable specified in a fraud rule relating to access pattern data.

Device fingerprint data analysis module 119(D) may be configured to analyze device fingerprint data to determine quantities or variables recited in a fraud rule. For example, device fingerprint data may be received by transaction analysis system 119 in a raw format comprising a manufacturer, product number, and operating system running on the computing device that conducted a transaction. However, a fraud rule may depend on the type of computing device (e.g., desktop computer, tablet, mobile phone, etc.) used to conduct a transaction. Accordingly, device fingerprint data analysis module 119(D) may determine the type of device by comparing the manufacturer and product number to a predetermined list of products for each device type. Similarly, device fingerprint data analysis module 119(D) may calculate any quantity or variable specified in a fraud rule relating to device fingerprint data.

In some embodiments of the invention, access pattern data analysis module 119(C) and device fingerprint data analysis module 119(D) may be further configured to store and retrieve data from user access pattern database 119(I) and device fingerprint database 119(J), respectively. For example, data analysis modules 119(C) and 119(D) may be used to calculate average or baseline statistics regarding prior access pattern data or device fingerprint data. In addition, access pattern data analysis module 119(C) and device fingerprint data analysis module 119(D) may be used to store known fraudulent or non-fraudulent data in user access pattern database 119(I) and device fingerprint database 119(J), respectively.

User access pattern database 119(I) may be used by server computer 119(A) to store user access pattern data for prior transactions. Similarly, device fingerprint database 119(J) may be used by server computer 119(A) to store device fingerprint data for prior transactions. In some embodiments, user access pattern data stored in user access pattern database 119(I) may be associated or linked with device fingerprint data stored in device fingerprint database 119(J). For example, each user access pattern may be associated with a device fingerprint for the device used to conduct the transaction. In one embodiment, this may be implemented by storing a foreign key associated with the device fingerprint for access patterns in the user access pattern database 119(I). Analogously, each device fingerprint may be associated with all user access patterns generated using the corresponding device, possibly over multiple transactions. In one embodiment, this may be implemented by storing one or more foreign keys associated with user access patterns for device fingerprints in device fingerprint database 119(J). This may enable transaction analysis system 119 to retrieve data for one or more user access patterns conducted using a device (e.g., user client computer 106).

A user 102 may be associated with any number of user access patterns stored in user access pattern database 119(I) and any number of device fingerprints stored in device fingerprint database 119(K). For example, in some embodiments, a foreign key associated with user 102 may be stored for access patterns for user 102 in user access pattern database 119(I) and device fingerprints for devices operated by user 102 in device fingerprint database 119(K). This may enable, for example, transaction analysis system 119 to determine, for each device used by user 102, access pattern data for all transactions conducted by user 102 using the device.

In addition, in some embodiments, a flag indicating whether the user access pattern or device fingerprint is fraudulent may be stored. In some embodiments, the flag may be set based on the evaluation of one or more fraud rules. Alternately, the flag may be set if a user 102 reports the transaction as fraudulent (e.g., to the issuer of user payment device 104), this indication may be used to improve the operation of fraud detection system 118 and transaction analysis system 118.

Fraud rule decisioning module 119(E) may be configured to receive transaction data for a transaction and determine a result for fraud rules relating to user access patterns or device fingerprints. Typically, fraud rule decisioning module 119(E) may evaluate a fraud rule using access pattern data analysis module 119(C) and device fingerprint analysis module 119(D) to determine quantities or variables recited in a fraud rule. The fraud rule may be evaluated using access pattern and fingerprint data relating to a transaction and prior data stored in user access pattern database 119(I) and device fingerprint database 119(J). The fraud rule decisioning module 119(E) may also be configured to provide an indication of the likelihood that a transaction is fraudulent to fraud detection system 118 or another computer such as merchant processor computer 120.

Returning now to FIG. 1 the merchant 112 can use the merchant client computer 114, which is communicatively coupled to the fraud detection system 118 via the communications medium 108 in order to access the fraud detection system 118. The merchant may further customize the interaction between fraud detection system 118 and transaction analysis system 119, for example to identify the data that will be used during fraud detection related to that particular merchant. The merchant client computer 114 may be in any suitable form. Example of merchant client computers include any device capable of accessing the Internet, such as a personal computer, cellular or wireless phones, personal digital assistants (PDAs), tablet PCs, and handheld specialized readers. The merchant client computer 114 transmits data through the communications medium 116 to the fraud detection system 118. In some embodiments of the invention, the merchant computer 110 and the merchant client computer 114 may be a single device.

The merchant computer 110 may be comprised of various modules that may be embodied by computer code, residing on computer readable media. It may include any suitable computational apparatus operated by a merchant. Examples of merchant computers may include an access device or an internet merchant computer. The merchant computer 110 may be in any suitable form. Additional examples of merchant computers include any device capable of accessing the Internet, such as a personal computer, cellular or wireless phones, personal digital assistants (PDAs), tablet PCs, and handheld specialized readers. The merchant computer 110 transmits data through the communications medium 108 to the user client computer 106. The merchant computer 110 may also transmit data to a merchant processor computer 120. In some embodiments of the invention, the merchant computer 110 receives transaction data from a user client computer 106 and transmits the transaction data to the merchant processor computer 120 for fraud evaluation and for further transaction authorization processes. The merchant computer 110 can further communicate with and/or receive input from a merchant client computer 114 operated by a merchant 112.

Figure 3:
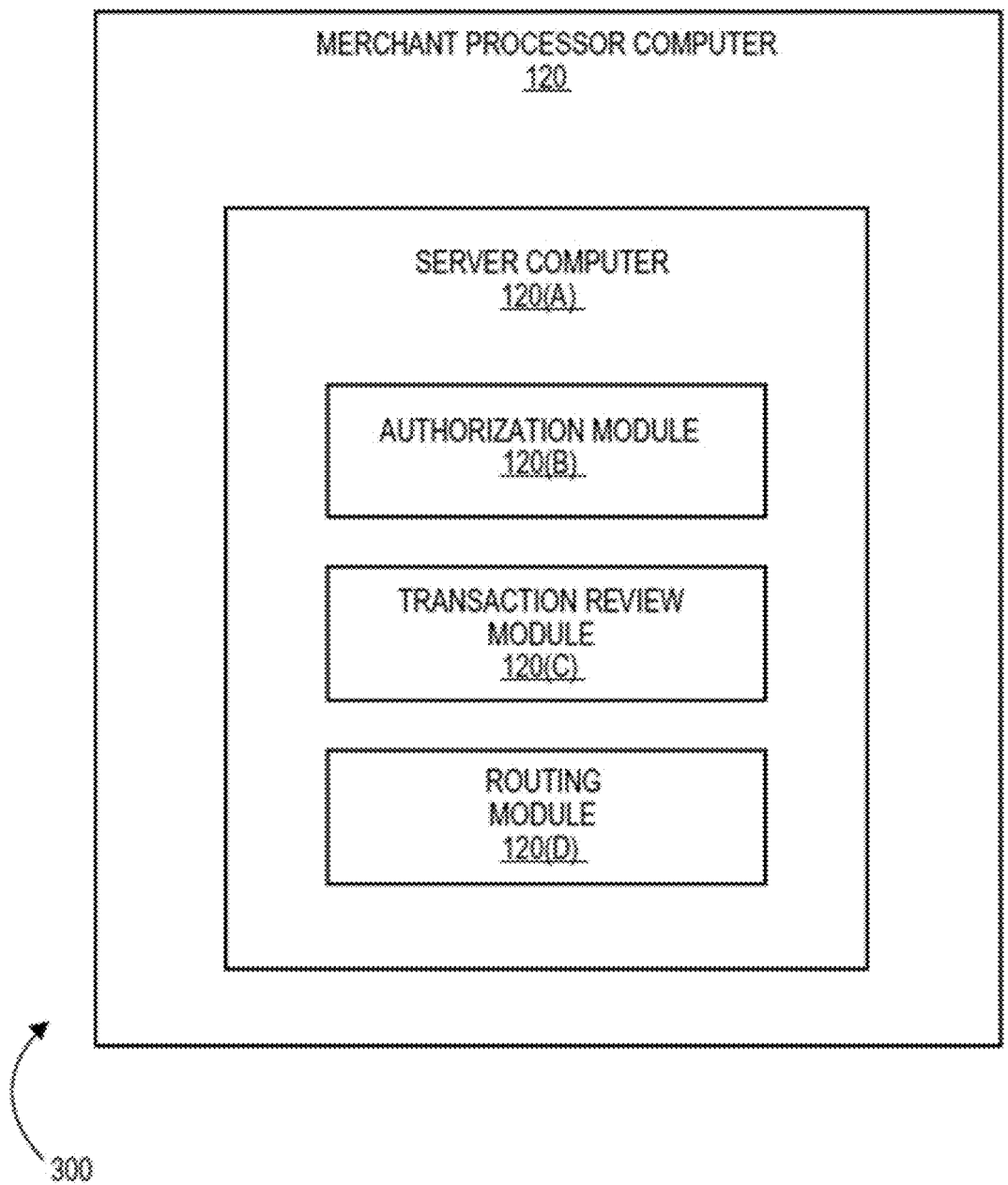
FIG. 3 shows a block diagram of components of a merchant processor computer.

As depicted in FIG. 3, the merchant processor computer 120 may comprise a server computer 120(A) comprising an authorization module 120(B), a transaction review module 120(C), and a routing module 120(D). The various modules may be embodied by computer code, residing on computer readable media.

The authorization module 120(B) may generate and process authorization request and response messages. The authorization module 120(B) may also determine the appropriate destination for the authorization request and response messages. An authorization request message is a message sent requesting that an issuer computer 126 authorize a financial transaction. An authorization request message may comply with ISO 8583, which is a standard for systems that exchange electronic transactions made by users using payment devices. An authorization request message according to other embodiments may comply with other suitable standards. In some embodiments of the invention, an authorization request message may include, among other data, a Primary Account Number (PAN) and expiration date associated with a payment device (e.g. credit/debit card) of the user, amount of the transaction (which may be any type and form of a medium of exchange such a money or points), and identification of a merchant (e.g. merchant ID). In some embodiments, an authorization request message is generated by a server computer (if the transaction is an e-commerce transaction) or a Point of Sale (POS) device (if the transaction is a brick and mortar type transaction) and is sent to an issuer computer 126 via a payment processing network 124 and an acquirer computer 122.

The transaction review module 120(C) conducts a fraud evaluation for transactions. If the transaction review module 120(C) determines that the transaction may be fraudulent, the transaction review module 120(C) may determine that the transaction should be denied. If the transaction review module 120(C) determines that the transaction is not fraudulent, the transaction review module 120(C) may determine that the transaction should be allowed. If the transaction review module 120(C) is unable to determine whether the transaction is fraudulent, the transaction review module 120(C) can send the transaction for further review.

The routing module 120(D) can route transactions to the appropriate destination. If a transaction is determined to be not fraudulent, the routing module 120(D) can route the message to the acquirer computer 122 for further processing. If the transaction is determined to be fraudulent, the routing module 120(D) can send the transaction back to the merchant. If the fraud evaluation conducted by the transaction review module 120(C) is indeterminate, the transaction can be routed to a further review by a person.

An acquirer computer 122 is typically a system for an entity (e.g. a bank) that has a business relationship with a particular merchant or other entity. An issuer computer 126 is typically a business entity (e.g. a bank) which maintains financial accounts for the user 102 and often issues a user payment device 104 such as a credit or debit card to the user 102. Some entities can perform both issuer computer 126 and acquirer computer 122 functions. Embodiments of the invention encompass such single entity issuer-acquirers.

Figure 4:
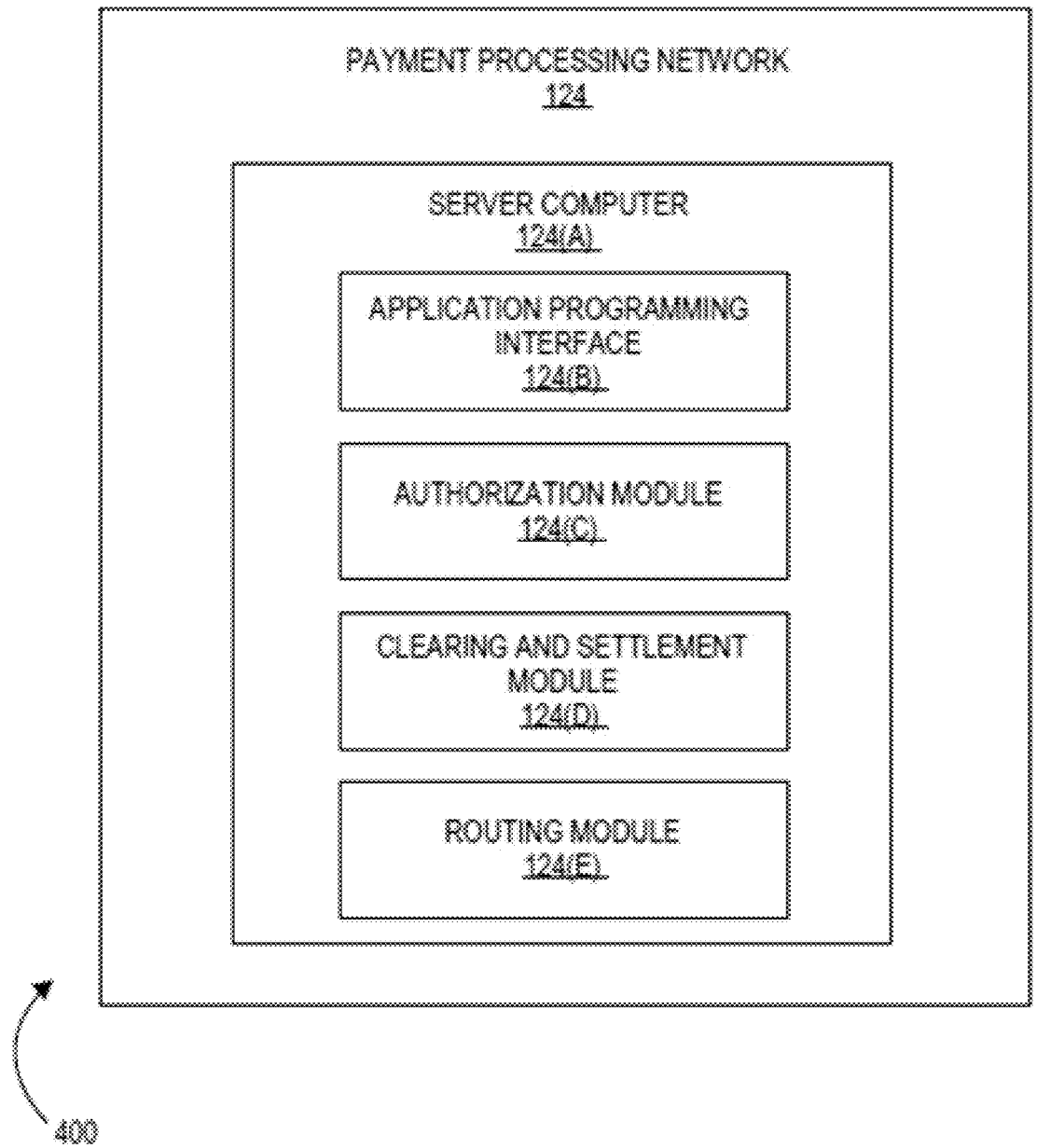
FIG. 4 shows a block diagram of components of a payment processing network.

As depicted in FIG. 4, the payment processing network 124 may comprise a server computer 124(A) comprising an application programming interface 124(B), an authorization module 124(C), a clearing and settlement module 124(D), and a routing module 124(E). The various modules may be embodied by computer code, residing on computer readable media.

As noted above, the payment processing network 124 may have or operate at least a server computer 124(A). In some embodiments, the server computer 124(A) may be coupled to a database and may include any hardware, software, other logic, or combination of the preceding for servicing the requests from one or more client computers. The server computer 124(A) may comprise one or more computational apparatuses and may use any of a variety of computing structures, arrangements, and compilations for servicing the requests from one or more client computers.

The payment processing network 124 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 124 may use any suitable wired or wireless network, including the Internet.

The authorization module 124(C) processes authorization request messages and determines the appropriate destination for the authorization request messages. The clearing and settlement module 124(D) handles the clearing and settlement of transactions. These modules authenticate user information and organize the settlement process of user accounts between the acquirer computer 122 and the issuer computer 126. An example of the clearing and settlement module is Base II, which provides clearing, settlement, and other interchange-related services to VISA members.

The routing module 124(E) handles the routing of authorization request messages from the acquirer computer 122 to the issuer computer 126, and the routing the authorization response messages back from the issuer computer 126 to the acquirer computer 122.

II. Exemplary Payment Transaction Methods

Figure 5:
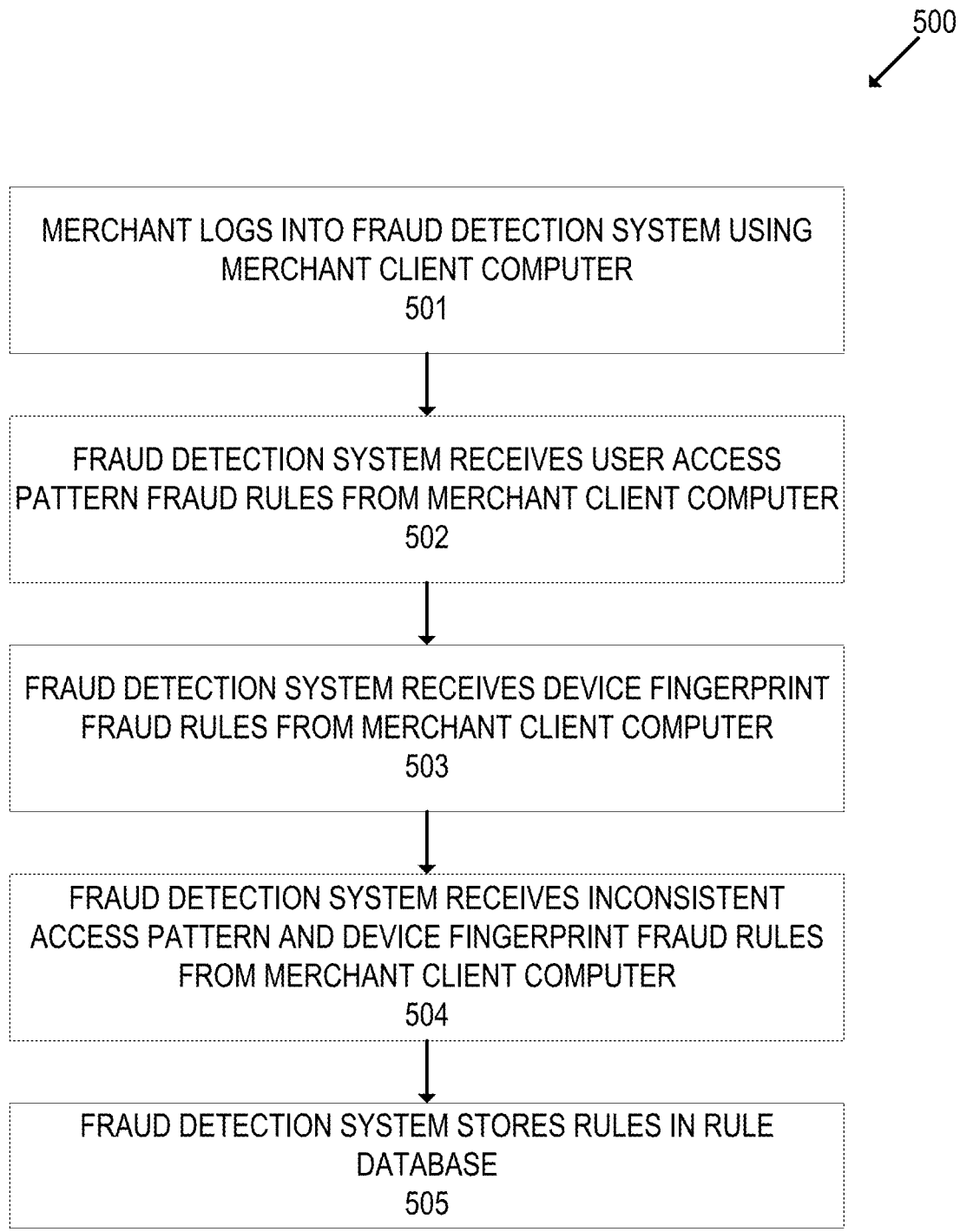
FIG. 5 shows a method for a merchant to define fraud rules relating to user access patterns and device fingerprints.

FIG. 5 shows a method 500 for merchant 112 to define fraud rules relating to user access patterns and device fingerprints.

At step 501, merchant 112 logs into the fraud detection system 118 using merchant client computer 114. In some embodiments, the merchant 112 may use a username and password corresponding to a merchant account maintained by fraud detection system 118. Fraud detection system 118 may authenticate merchant 112 by referencing a merchant database 118(J).

At step 502, fraud detection computer 118 receives user access pattern fraud rules from merchant client computer 114. A user access pattern fraud rule may be used to determine if user access pattern data for the transaction indicates fraud. For example, a user access pattern fraud rule may indicate that a transaction with a velocity of mouse clicks or web page requests above a certain threshold is determined to indicate fraud (e.g., because the transaction was likely conducted by a bot).

At step 503, fraud detection computer 118 receives device fingerprint fraud rules from merchant client computer 114. A device fingerprint fraud rule may be used to determine if device fingerprint data for the transaction indicates fraud. For example, a device fingerprint fraud rule may indicate that a transaction conducted using a device that is associated with over a certain threshold of accounts indicates fraud, so that if device used to conduct a transaction is associated with hundreds of user accounts, the transaction is determined to be fraudulent (e.g., because it is unlikely that an uncompromised device would be used to access hundreds of user accounts).

At step 504, fraud detection system 118 receives inconsistent access pattern and device fingerprint fraud rules from a merchant client computer 114. An inconsistent access pattern and device fingerprint fraud rule may be used to determine if an inconsistency between user access pattern data and device fingerprint data indicates fraud. In some embodiments, the inconsistency may relate to the combination of the type of device and the access pattern. For example, a user operating a mobile phone will typically have a lower text input speed than the user operating a desktop computer. Accordingly, an inconsistent access pattern and device fingerprint fraud rule may be defined so that a transaction conducted by a user operating a mobile phone with a text input speed significantly greater than a user's average on a desktop is determined to indicate fraud (e.g., because it is unlikely that a legitimate user would input text faster on a mobile phone than a desktop computer).

At step 505, fraud detection system 118 stores the received fraud rules in a rule database. In some embodiments of the invention, fraud detection system 118 may store the received fraud rules in fraud rules database 118(K) or merchant profiles database 118(K).

It should be noted that fraud rules may be received at fraud detection system 118 by any suitable method. For example, in some embodiments, a merchant 112 may construct new fraud rules by defining a conditional using various access pattern data fields and/or device fingerprint data fields. Such fraud rules may be associated with the merchant's profile and stored in any suitable database. Alternately, a merchant 112 may choose from a number of user access pattern fraud rules, device fingerprint fraud rules, inconsistent access pattern and device fingerprint fraud rules, or other fraud rules which may already be defined in fraud detection system 118 (e.g., in fraud rules database 118(K)). Merchant 112 may optionally modify the pre-defined rules, and such modifications may be stored in fraud rules modification database 118(M).

III. Exemplary Payment Transaction Methods

Figure 6:
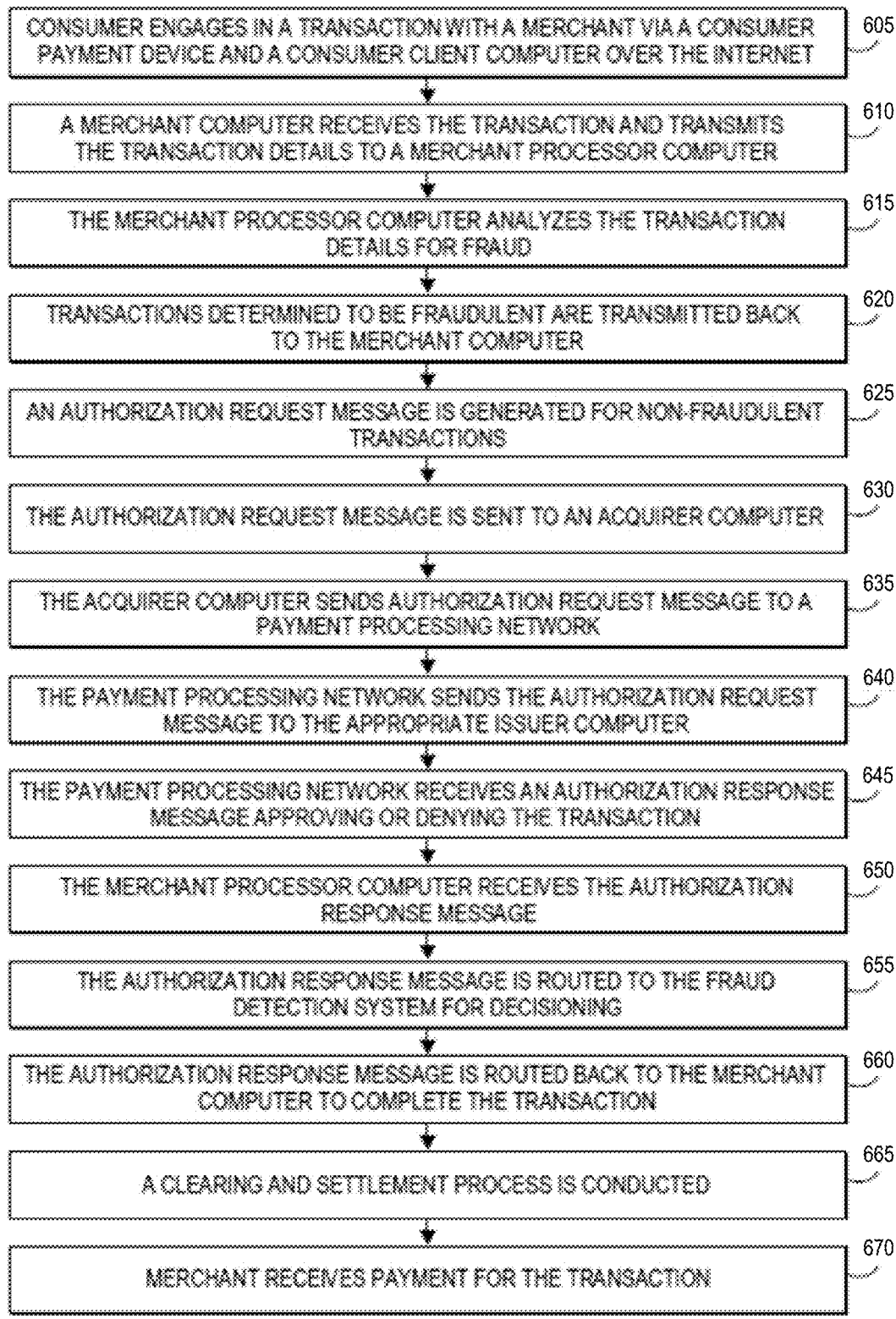
FIG. 6 shows a method for processing a transaction through a system.

FIG. 6 is a flowchart of a method 600 for processing a transaction through a system 100 shown in FIGS. 1-4.

At step 605, in a typical transaction, the user 102 engages in a payment transaction for goods or services at a merchant 112 associated with a merchant computer 110 using a user client computer 106 and a user payment device 104 such as a credit card or mobile phone. For example, the user 102 may use their Internet-enabled mobile phone to access a merchant website to conduct a transaction using their user payment device 104.

In some embodiments, user access pattern data and device fingerprint data may be measured before and during a payment transaction. For example, if the user 102 is purchasing one or more items at a merchant website operated by merchant computer 110, mouse clicks, keystrokes, or any other access pattern data may be measured as the user 102 searches for keywords, browses items, follows links, performs a checkout operation, or otherwise navigates the merchant website. Similarly, device fingerprint data may be collected before and during a payment transaction.

At step 610, a merchant computer 110 receives the transaction from the consumer client computer 106 and may then transmit the transaction details to a merchant processor computer 120. Transactions details may be comprised of, but is not limited to, the following: consumer name, consumer billing address, consumer shipping address, consumer phone number, consumer account number, and items purchased, item prices, etc. Transaction details may also comprise user access pattern data associated with the transaction, and device fingerprint data associated with the transaction.

At step 615, the merchant processor computer 120 may conduct a fraud analysis and determine whether the transaction should proceed or whether it should be rejected and returned to the merchant computer 110. The merchant processor computer 120 may use the transaction details in conjunction with access pattern data and device fingerprint data received from transaction analysis system 119 along with data stored by the merchant computer 110, fraud detection system 118, or any other element of FIG. 1 in determining whether the transaction may be fraudulent. In some embodiments, the fraud detection system 118 may then undertake a decision process based on the authorization response message. In some embodiments of the invention, the decision process may comprise the method shown in FIG. 7.

If the result from the fraud detection system 118 is an "ACCEPT", the transaction between the merchant and the consumer 102 can be further processed and completed. If the result from the fraud detection system 118 is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In some embodiments of the invention, the message does not indicate that a "REJECT" was determined for the transaction as the consumer 102 may be attempting to conduct fraudulent transactions. If the result from the fraud detection system 118 is a "REVIEW", the fraud detection system 118 would "hold" the transaction until it can be further reviewed, and it is determined whether it should be accepted or rejected.

At step 620, if the merchant processor computer 120 determines that the transaction details indicate that the transaction may be fraudulent, the merchant processor computer 120 may return the transaction to the merchant computer 110 indicating that the transaction is fraudulent and should be declined.

At step 625, if the merchant processor computer 120 determines that the transaction details indicate that the transaction is not fraudulent, an authorization request message may then be generated. The authorization request message may be generated in any suitable format.

An "authorization request message" may include an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

At step 630, the generated authorization request message may be transmitted by the merchant processor computer 120 to an acquirer computer 122. The authorization request message may be transmitted in any suitable format.

At step 635, after receiving the authorization request message, the authorization request message may then be transmitted to a payment processing network 124.

At step 640, after receiving the authorization request message, the payment processing network 124 may then transmit the authorization request message to an appropriate issuer computer 126 associated with the consumer payment device 104.

At step 645, the issuer computer 126 receives the authorization request message. The issuer computer 126 may then determine whether the transaction should be authorized. The issuer computer 126 transmits an authorization response message back to the payment processing network 124. The authorization response message can indicate whether or not the current transaction has been authorized or has been declined.

An "authorization response message" may include an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

At step 650, the payment processing network 124 may then forward the authorization response message back to the acquirer computer 122. The acquirer computer 122 may then send the response message back to the merchant processor computer 120.

At step 655, the merchant processor computer 120 may then send the authorization response message to a fraud detection system 118.

At step 660, after the merchant computer 110 receives the authorization response message, the merchant computer 110 may then provide the authorization response message to the consumer 102. For example, the consumer 102 may be presented with a screen on the consumer client computer 106 indicating success or failure of authorization. In other embodiments, the authorization response message may be displayed by the POS terminal, or may be printed out on a receipt.

In step 665, at the end of the day or at a period determined by the merchant, a normal clearing and settlement process can be conducted. A clearing and settlement process may include a process of reconciling a transaction. A clearing process is a process of exchanging financial details between an acquirer computer 122 and an issuer computer 126 to facilitate posting to a party's account and reconciliation of the party's settlement position. Settlement involves the delivery of securities from one party to another. In some embodiments, clearing and settlement can occur simultaneously. In other embodiments, the clearing and settlement process can be conducted by the fraud detection system 118 once the fraud detection system 118 has determined that the transaction should be accepted.

In step 670, the merchant receives payment for the transaction.

It should be noted that the method described for FIG. 6 is intended to be illustrative and not limiting. For example, as explained above, the method of FIG. 7 may be performed at merchant processor computer 120 during step 615, so that no authorization request message is generated for a transaction determined to be fraudulent. In other embodiments, the method of FIG. 7 may be performed at step 655 by the merchant processor computer 120. In yet other embodiments, the method of FIG. 7 may be performed at issuer computer 126. In yet other embodiments, the method of FIG. 7 may be performed at the payment processing network 124.

IV. Exemplary Fraud Rule Evaluation Methods

Figure 7:
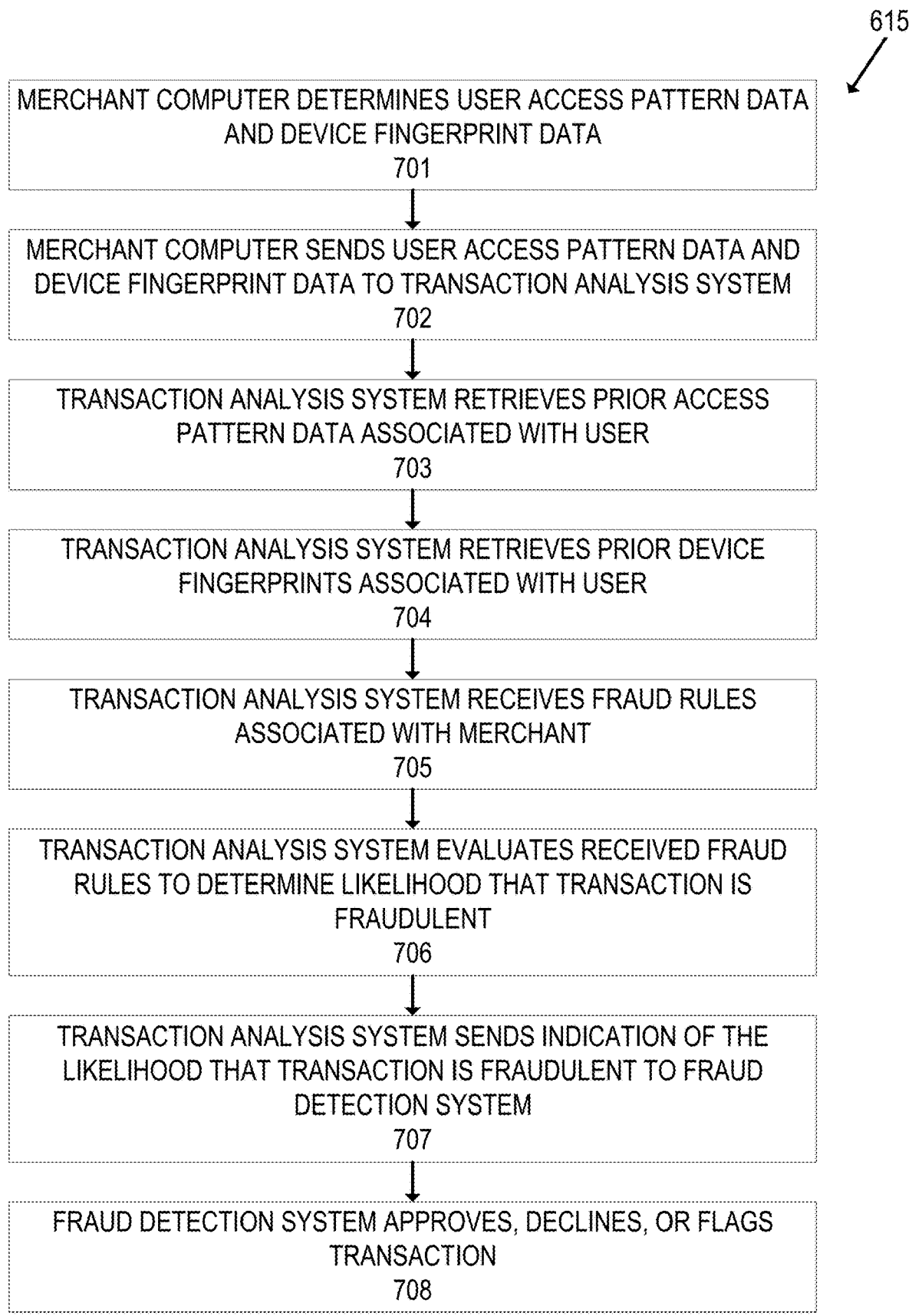
FIG. 7 shows a method for evaluating fraud rules to determine a transaction outcome for a transaction.

FIG. 7 shows a method for evaluating fraud rules to determine a transaction outcome for a transaction. In some embodiments of the invention, the method of FIG. 7 may be performed as a part of step 655 in the method of FIG. 6.

At step 701, merchant computer 110 determines user access pattern data and device fingerprint data for the user 102 conducting the transaction. User access pattern data and device fingerprint data may be measured by any suitable method. For example, in some embodiments, the user access pattern data or device fingerprint data may be measured using instrumentation on user client computer 104. In one example, the merchant website may comprise Javascript™, HTML 5, Adobe® Flash, or another program suitable for recording user access patterns. The access patterns may be transmitted to the merchant computer 110 asynchronously (e.g., using Ajax), or synchronously (e.g., as part of a GET request for a subsequent web page). Device fingerprint data may be similarly measured and transmitted to merchant computer 110.

Alternately, in some embodiments, the user access pattern data or device fingerprint data may be determined at the merchant computer 110. For example, merchant computer 110 may log the frequency and content of incoming HTTP requests for a user 102. A semantic analysis of the content of the HTTP requests may be used to collect access pattern data. For example, the rate of navigation of the user through the merchant website may be determined through the URL field of the HTTP requests. Similarly, device fingerprint data may be determined through various header fields in the HTTP request, such as the user agent (i.e., browser) used to connect to the website, the IP address of the user client computer 106, and the MAC address of the user client computer 106.

In yet other embodiments, a third party computing device may collect the access pattern data or device fingerprint data. For example, a gateway between a client computer and a server computer may be used to capture access pattern and device fingerprint data without requiring additional processing or latency on either the client computer or server computer. The third party may transmit the user access pattern data and device fingerprint data to merchant computer 110.

At step 702, merchant computer 110 sends the user access pattern data and device fingerprint data to transaction analysis system 119. Merchant computer 110 may transmit the user access pattern data and device fingerprint data using any suitable means. For example, the data may be included in transaction details transmitted to the merchant processor computer 112. The merchant processor computer 112 may then forward the transaction details to fraud detection system 118 and transaction analysis system 119. Alternately, merchant computer may send the access pattern data and device fingerprint data to transaction analysis system 119 using communications medium 116.

At step 703, transaction analysis system 119 retrieves prior access pattern data associated with the user 102 conducting the transaction. In some embodiments, the prior access pattern data may be retrieved from user access pattern database 119(I).

At step 704, transaction analysis system 119 retrieves prior device fingerprint data associated with the user 102 conducting the transaction. In some embodiments, the prior device fingerprint data may be retrieved from device fingerprint database 119(J).

At step 705, transaction analysis system 119 accesses fraud rules associated with the merchant 112 associated with the transaction. In some embodiments of the invention, fraud detection system 118 may retrieve the fraud rules associated with merchant 112 using merchant database 118(J), merchant profiles database 118(L), and fraud rules database 118(K). Fraud detection system 118 may then send the retrieved fraud rules to transaction analysis system 119.

At step 706, transaction analysis system 119 evaluates the received fraud rules to determine a likelihood that the transaction is fraudulent. The fraud rules may recite any combination of conditions relating to user access pattern data, device fingerprint data, or any other data. For example, FIG. 8 shows an exemplary method for evaluating fraud rules.

Figure 8:
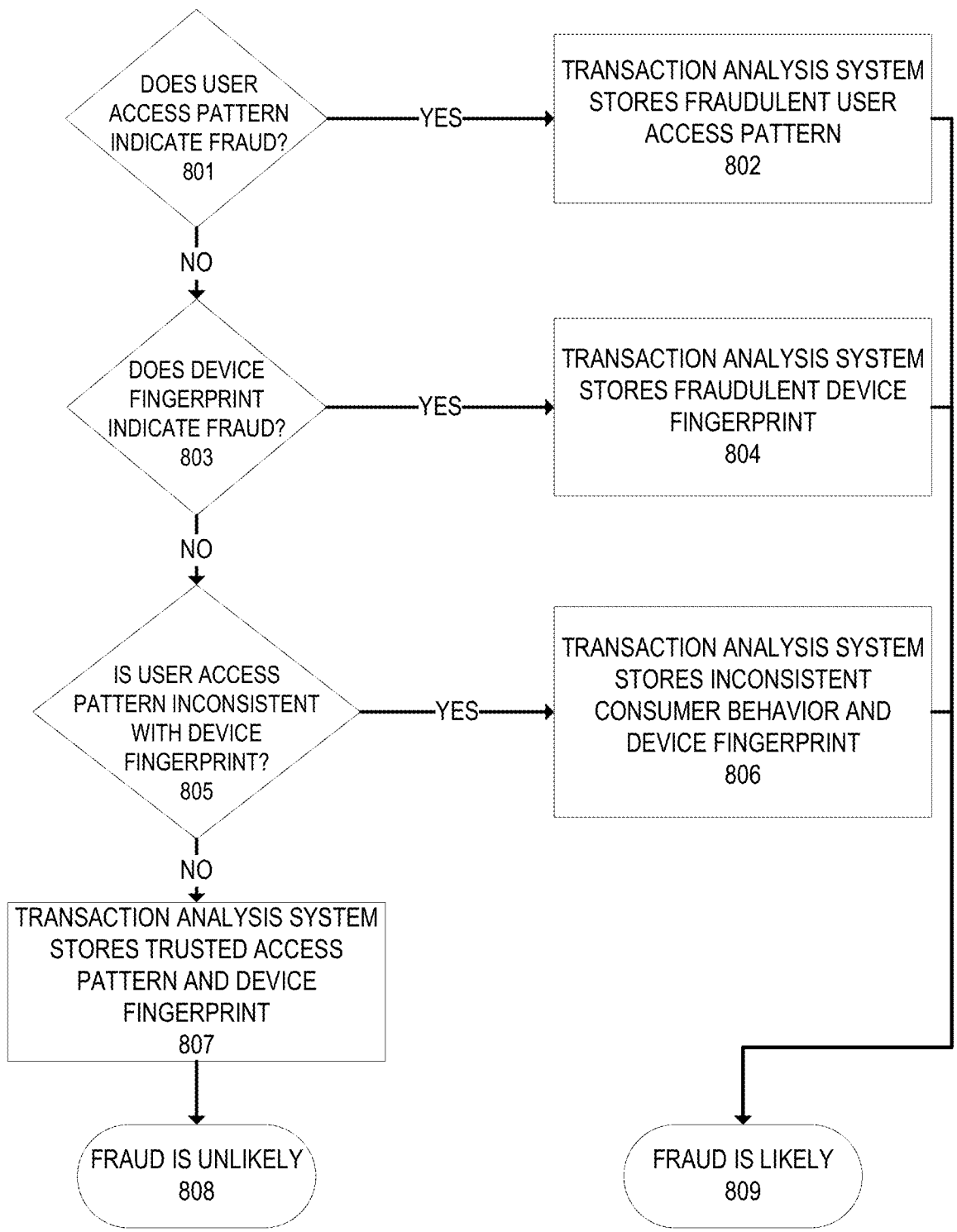
FIG. 8 shows an exemplary method for evaluating user access pattern fraud rules, device fingerprint fraud rules, and inconsistent access pattern and device fingerprint fraud rules to determine the likelihood that a transaction is fraudulent.

FIG. 8 shows an exemplary method for evaluating user access pattern fraud rules, device fingerprint fraud rules, and inconsistent access pattern and device fingerprint fraud rules to determine the likelihood that a transaction is fraudulent.

At conditional step 801, transaction analysis system 119 determines if the user access pattern for a transaction indicates fraud. Typically, this may be determined by evaluating one or more user access pattern fraud rules for the merchant 112 associated with the transaction. If the user access pattern fraud rules indicate that the transaction is fraudulent, then the method stores the fraudulent access pattern at step 802. Otherwise, the method proceeds to step 803.

At conditional step 803, transaction analysis system determines if the device fingerprint indicates fraud. Typically, this may be determined by evaluating one or more device fingerprint fraud rules for the merchant 112 associated with the transaction. If the device fingerprint fraud rules indicate that the transaction is fraudulent, then the method stores the fraudulent device fingerprint at step 804. Otherwise, the method proceeds to step 805.

At conditional step 805, transaction analysis system determines if the user access pattern is inconsistent with the device fingerprint. Typically, this may be determined by evaluating one or more inconsistent access pattern and device fingerprint fraud rules for the merchant 112 associated with the transaction. If the inconsistent access pattern and device fingerprint fraud rules indicate that the transaction is fraudulent, then the method stores the inconsistent access pattern and device fingerprint at step 806. Otherwise, the method proceeds to step 807.

At step 802, 804, and 806, the transaction analysis system 119 stores data that indicated the transaction is fraudulent. The fraudulent data may be stored in access pattern database 118(I) or device fingerprint database 118(J). The fraudulent data may also be used to evaluate subsequent transactions. For example, a subsequent transaction may be flagged for manual review if it shares the same device fingerprint as a previous fraudulent transaction. In addition, the stored fraudulent transactions may be used to develop new fraud rules. For each of steps 802, 804, and 806, transaction analysis system 119 indicates that fraud is likely at step 809.

At step 807, transaction analysis system 119 stores trusted access pattern and device fingerprint data. The trusted data may be stored in a database of consumer information (not shown) and may be used to evaluate subsequent transactions, or to develop new fraud rules. The database of consumer information may store data relating to the consumer, the consumer's access devices (e.g., a phone, laptop computer, etc.) that are used to make purchase transactions, the consumer's relative or absolute frequency of use of each device, and access behavior associated with each type of device. For example, if a consumer's device identifiers used in past transactions history may show that purchases are made by the consumer's mobile phone 25% of the time and are made by the consumer's laptop computer 75% of the time. The consumer may further have a particular pattern of data input (e.g., keystroke speed) associated with each device. For instance, the consumer may have an average data input speed of X characters per minute using the mobile phone, while the consumer may have an average input speed of Y characters per minute using a laptop computer. This information can be used to evaluate future transactions to determine if they originate from the same consumer. By using a database of this type, fewer future authentication transactions will be declined and more non-authentic transactions will be rejected, thus resulting in improved processing efficiency.

At step 808, the transaction analysis system 118 indicates that fraud is unlikely for the transaction.

Returning to FIG. 7, at step 707, transaction analysis system 119 sends an indication of the likelihood that the transaction is fraudulent to fraud detection system 118. In some embodiments, at step 708, fraud detection system 118 may then approve, decline, or flag a transaction for manual review based on the indicated likelihood (e.g., by declining the transaction in the authorization response message). Fraud detection system 118 may also assign an ultimate fraud score for the transaction using the sent indication.

In one example, a user 102 conducts a payment transaction using user client computer 106 at a merchant website operated by merchant computer 110. At step 701 merchant computer 110 receives user access pattern data and device fingerprint data for the payment transaction from third-party vendors. The user access pattern data comprises an ordered list of mouse clicks and timestamps that occurred while the user navigated the merchant website. The device fingerprint comprises a manufacturer name, product number, and serial number for the device conducting the payment transaction. In the example, the device fingerprint data indicates that the user 102 is operating a Galaxy Note™ tablet computer by Samsung®. The user access pattern data indicates that the user 102 had an average click frequency of one click every 15 seconds as the user 102 navigated the merchant website and conducted the payment transaction.

At step 702, merchant computer 110 sends the user access pattern data and device fingerprint data to transaction analysis system 119. At steps 703 and 704, transaction analysis system 119 retrieves prior access pattern data and device fingerprint data associated with the user 102. The prior access pattern and device fingerprint data indicates that user 102 typically operates computing devices slowly: user 102 has an average click frequency of once per 10 seconds on desktop computers, once per 35 seconds on tablets, and once per minute on mobile phones.

At step 705, transaction analysis system 119 receives fraud rules associated with the merchant 112 associated with the transaction. The fraud rules are retrieved from fraud rule database 118(K) in fraud detection system 118. One fraud rule recites that a click frequency greater than double the user's average for the device used indicates fraud.

At step 706, transaction analysis system 119 evaluates the received fraud rule to determine the likelihood that the transaction is fraudulent. Since the click frequency for the current transaction was determined to be once every 15 seconds, and the user's average click frequency for tablets is once every 35 seconds, the current transaction is determined to have a click frequency approximately 2.33 times greater than the average for user 102. Thus, based on the fraud rule, the transaction is determined to be fraudulent.

At step 707, transaction analysis system 119 sends a notification message to fraud detection system 118 that the evaluated rule indicated fraud. Fraud detection system 118 may also evaluate or receive the result of a number of other fraud rules. In the described example, fraud detection system 118 is configured to decline a transaction if at least one fraud rule indicates fraud. Therefore, at step 708, fraud detection system 118 determines a declines the transaction. In some embodiments, the status of the transaction is indicated in an authorization response message transmitted to merchant computer 110 and the result is indicated to user 102.

It should be noted that the method described for FIG. 7 is intended to be illustrative and not limiting. For example, in some embodiments, steps 701 and 702 may be performed by a computing device other than merchant computer 102. For example, merchant processing computer 112 may be used to determine user access pattern data and device fingerprint data. Alternately, transaction analysis system 119 may receive the user access pattern data and device fingerprint data from one or more third parties.

V. Exemplary Computer Apparatuses

Figure 9:
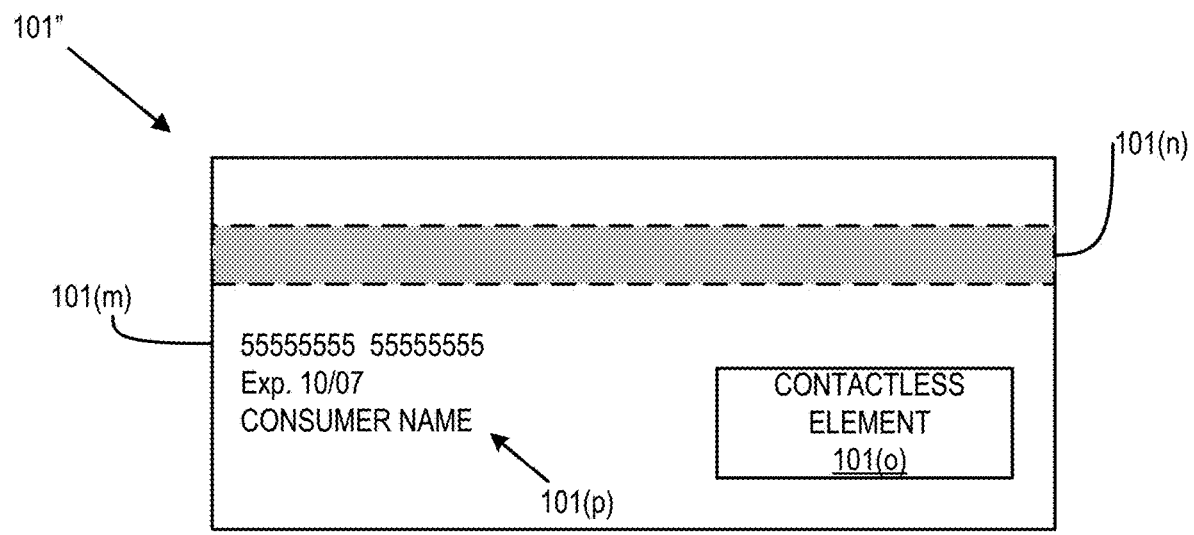
FIG. 9 shows an example of a payment device in the form of a card.

FIG. 9 shows an example of a payment device 101" in the form of a card. As shown, the payment device 101" comprises a plastic substrate 101(m). In some embodiments, a contactless element 101(o) for interfacing with an access device 102 may be present on, or embedded within, the plastic substrate 101(m). User information 101(p) such as an account number, expiration date, and/or a user name may be printed or embossed on the card. A magnetic stripe 101(n) may also be on the plastic substrate 101(m). In some embodiments, the payment device 101" may comprise a microprocessor and/or memory chips with user data stored in them.

As noted above and shown in FIG. 9, the payment device 101" may include both a magnetic stripe 101(n) and a contactless element 101(o). In some embodiments, both the magnetic stripe 101(n) and the contactless element 101(o) may be in the payment device 101". In some embodiments, either the magnetic stripe 101(n) or the contactless element 101(o) may be present in the payment device 101".

Figure 10:
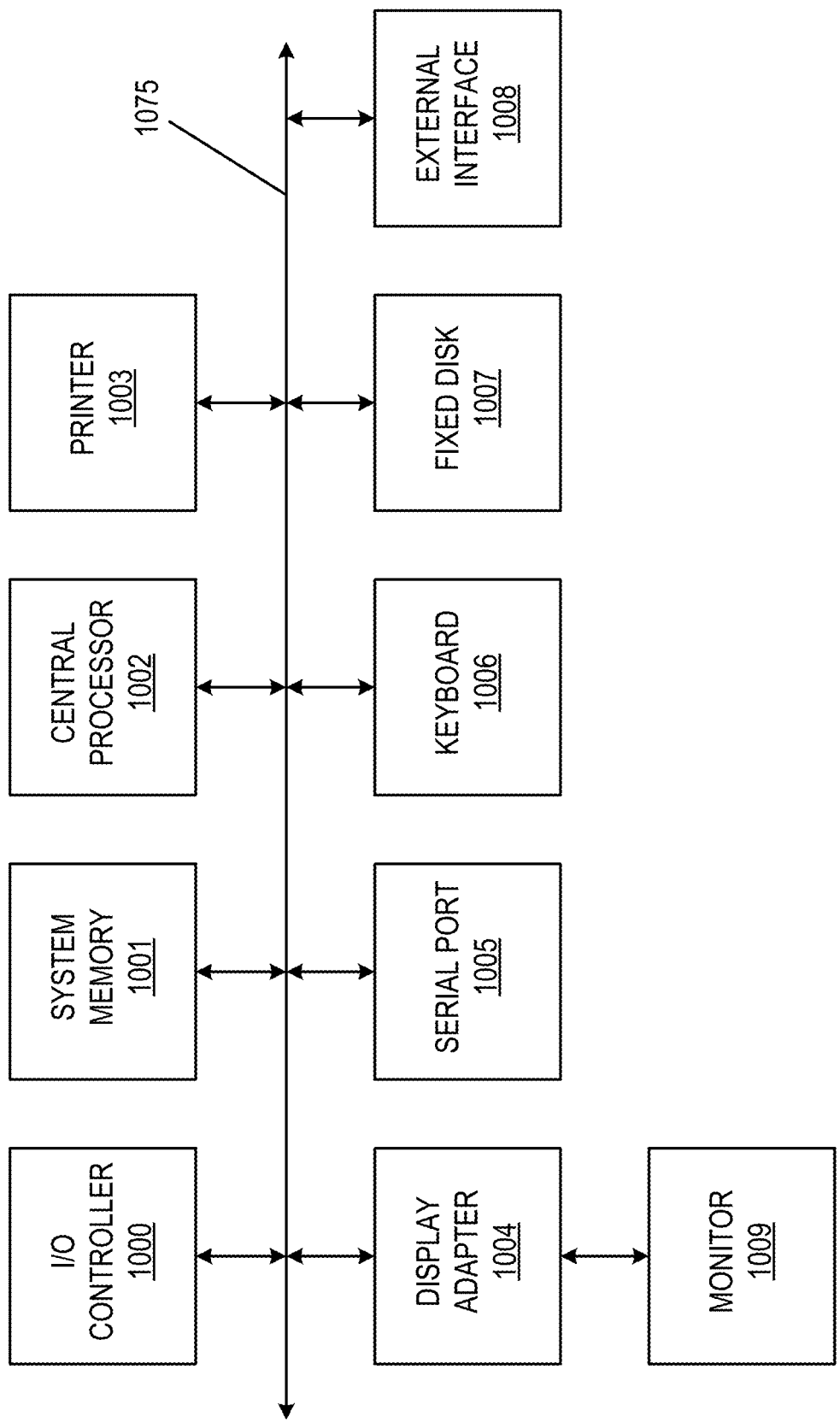
FIG. 10 is a high level block diagram of a computer system that may be used to implement any of the entities or components described for embodiments of the invention.

FIG. 10 is a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004. Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the central processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

VI. Additional Embodiments

It is noted that other embodiments of the invention are possible. For example, some embodiments of the invention may relate to generating rules associated with other behavior. For example, some embodiments of the invention may relate to generating rules for likely user behavior or user preferences, such as for a marketing application. In such embodiments, field values may be used to determine, for example, whether a user may be interested in a product. It is noted that the systems and methods described above may be used generally for any service involving forming predictive rules using past data fields and field values.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
   receiving, by a processor over a network, user access pattern data generated by a user client computer, wherein the user client computer is used to request an authentication process, wherein the user access pattern data corresponds to user interactions of a user with one or more input devices of the user client computer, the user interactions detected by the one or more input devices;
   receiving, by the processor over the network, device fingerprint data associated with the user client computer;
   determining, by the processor, a type of device for the user client computer by using the device fingerprint data to access a list of device types;
   calculating, by the processor, a value of user interactions with the user client computer based on the user access pattern data;
   determining, by the processor, a likelihood that the request is fraudulent by comparing the value to a threshold; and
   declining, by the processor, authentication of the user if the likelihood indicates that the user access pattern data is inconsistent with the type of device determined based on the device fingerprint data.

2. The computer-implemented method of claim 1, wherein the list of device types includes a mobile computing device and a desktop computing device.

3. The computer-implemented method of claim 1, wherein the user access pattern data includes user interactions of the user with the one or more input devices that occurred while the user navigated a website.

4. The computer-implemented method of claim 1, wherein the threshold is associated with the user utilizing a user device that is of a same type of device as the user client computer.

5. The computer-implemented method of claim 1, further comprising
   receiving, from a merchant client computer, one or more user access pattern fraud rules and a device fingerprint fraud rule; and
   wherein determining, by the processor, the likelihood that the request is fraudulent by comparing the value to the threshold is based on the one or more user access pattern fraud rules and the device fingerprint fraud rule, wherein the user access pattern fraud rules includes the threshold.

6. The computer-implemented method of claim 5, wherein the value is a number of user accounts or a number of web page access requests.

7. The computer-implemented method of claim 1, wherein the authentication process is part of a payment transaction processing.

8. The computer-implemented method of claim 1, wherein the value is a number of input device interactions or an input speed of user interactions on an input device.

9. The computer-implemented method of claim 1, wherein the request is associated with a transaction, and wherein the method further comprises:
   declining the transaction if the user access pattern data is inconsistent with prior user access pattern data associated with the user.

10. The computer-implemented method of claim 1, further comprising:
    declining the authentication of the user if the device fingerprint data is inconsistent with prior device fingerprints associated with the user.

11. A transaction analysis system, comprising:
    a processor; and
    a non-transitory computer-readable storage medium, comprising code executable by the processor for implementing a method comprising:
    receiving, over a network, user access pattern data generated by a user client computer, wherein the user client computer is used to request an authentication process, wherein the user access pattern data corresponds to user interactions of a user with one or more input devices of the user client computer, the user interactions detected by the one or more input devices;
    receiving, over the network, device fingerprint data associated with the user client computer;
    determining a type of device for the user client computer by using the device fingerprint data to access a list of device types;
    calculating a value of user interactions with the user client computer based on the user access pattern data;
    determining a likelihood that the request is fraudulent by comparing the value to a threshold; and
    declining authentication of the user if the likelihood indicates that the user access pattern data is inconsistent with the type of device determined based on the device fingerprint data.

12. The transaction analysis system of claim 11, wherein the list of device types includes a mobile computing device and a desktop computing device.

13. The transaction analysis system of claim 11, wherein the user access pattern data includes user interactions of the user with the one or more input devices that occurred while the user navigated a website.

14. The transaction analysis system of claim 11, wherein the threshold is associated with the user utilizing a user device that is of a same type of device as the user client computer.

15. The transaction analysis system of claim 11, the method further comprising
receiving, from a merchant client computer, one or more user access pattern fraud rules and a device fingerprint fraud rule; and
wherein determining the likelihood that the request is fraudulent by comparing the value to the threshold is based on the one or more user access pattern fraud rules and the device fingerprint fraud rule, wherein the user access pattern fraud rules includes the threshold.

16. The transaction analysis system of claim 11, wherein the authentication process is part of a payment transaction processing.

17. The transaction analysis system of claim 11, wherein the value is a number of input device interactions or an input speed of user interactions on an input device.

18. The transaction analysis system of claim 11, wherein the request is associated with a transaction, and wherein the method further comprises:
declining the transaction if the user access pattern data is inconsistent with prior user access pattern data associated with the user.

19. The transaction analysis system of claim 11, wherein the method further comprises:
declining the authentication of the user if the device fingerprint data is inconsistent with prior device fingerprints associated with the user.

20. A non-transitory computer-readable storage medium, comprising code executable by a processor for implementing a method comprising:
receiving, over a network, user access pattern data generated by a user client computer, wherein the user client computer is used to request an authentication process, wherein the user access pattern data corresponds to user interactions of a user with one or more input devices of the user client computer, the user interactions detected by the one or more input devices;
receiving, over the network, device fingerprint data associated with the user client computer;
determining a type of device for the user client computer by using the device fingerprint data to access a list of device types;
calculating a value of user interactions with the user client computer based on the user access pattern data;
determining a likelihood that the request is fraudulent by comparing the value to a threshold; and
declining authentication of the user if the likelihood indicates that the user access pattern data is inconsistent with the type of device determined based on the device fingerprint data.

* * * * *